United States Patent Office 3,773,748
Patented Nov. 20, 1973

3,773,748
METAL COMPLEXES OF SUBSTITUTED
CARBAMOYL FORMAZANES
Philippe Grandjean and Willy Steinemann, Basel, Switzerland, assignors to Sandoz Ltd., Basel, Switzerland
No Drawing. Filed Sept. 26, 1969, Ser. No. 861,450
Claims priority, application Switzerland, Sept. 27, 1968, 14,527/68; Oct. 16, 1968, 15,451/68
Int. Cl. C09b 45/48
U.S. Cl. 260—149                    10 Claims

ABSTRACT OF THE DISCLOSURE

Metal-containing formazane compounds which in the metal-free state have the formula

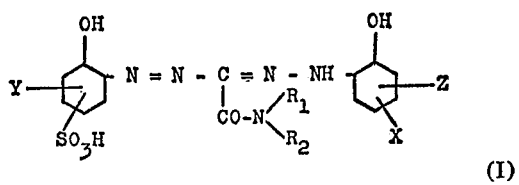

(I)

wherein X is halogen, each of Y and Z is hydrogen, halogen, nitro, alkyl or acylamino, $R_1$ is hydrogen or optionally substituted alkyl, $R_2$ is an optionally substituted aliphatic, cycloaliphatic or aromatic radical of the benzene series or $R_1$, $R_2$ and N form together a heterocyclic ring.

This invention relates to metal-containing formazane compounds which in the metal-free state have the formula

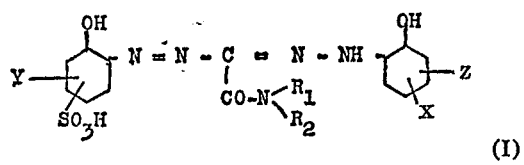

(I)

where

X stands for a halogen atom,
Y for a hydrogen or halogen atom, a nitro group, an optionally substituted lower alkyl group or an optionally substituted acylamino group,
Z for a hydrogen or halogen atom, a nitro group, an optionally substituted lower alkyl group or an optionally substituted acylamino group,
$R_1$ for a hydrogen atom or an optionally substituted aliphatic radical,
and $R_2$ for an optionally substituted aliphatic, cycloaliphatic or aromatic radical of the benzene series, or where $R_1$, $R_2$ and the adjacent N atom form a heterocyclic ring and the compound of Formula I bears only one sulfo group.

The process for the production of the metal-containing formazane compounds consists in reacting 1 mole of the diazo compound of an amine of the formula

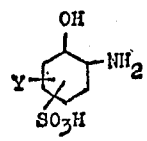

(II)

with 1 mole of a hydrazone of the formula

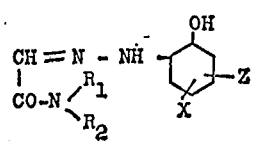

(III)

and treating the reaction product with a metal-yielding agent, or in reacting 1 mole of the diazo compound of an amine of the formula

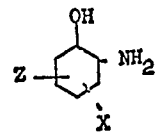

(IV)

with 1 mole of a hydrazone of the formula

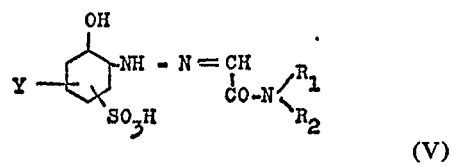

(V)

and treating the reaction product with a metal-yielding agent.

The hydrazones of Formulae III and V can be prepared, for example, by alkaline deacetylation of monoazo compounds of the formula

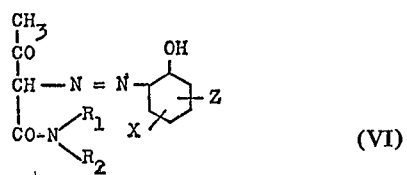

(VI)

or

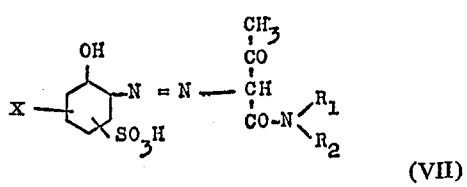

(VII)

Examples of optionally substituted lower alkyl groups are alkyl groups bearing 1 to 5 carbon atoms. These alkyl groups may be straight or branched and may bear substituents, such as hydroxyl or alkoxy groups ($CH_3O$, $C_2H_5O$).

Fluorine, bromine and in particular chlorine atoms may be mentioned to exemplify the halogen atoms present.

The suitable acylamino groups include alkanoylamino (alkanamido) and alkylsulphonylamino groups having 1 to 5 carbon atoms in the alkanoyl or alkyl radical (formyl-, acetyl-, propionyl-, butyryl- or valerianylamino; methylsulphonyl-, ethylsulphonylamino), alkoxycarbonylamino groups having 1 to 5 carbon atoms in the alkoxy radical, alkoxyalkoxycarbonylamino groups having 3 to 6 carbon atoms in the two alkoxy groups, and benzoylamino (benzamido) groups which may be substituted in the benzene nucleus by lower alkyl or alkoxy groups, nitro groups or halogen atoms. The acylamino groups comprise further the derivatives which are substituted on the nitrogen atom by lower alkyl groups (methyl, ethyl) or aralkyl groups (benzyl).

The acylamino groups present in the final dye can be converted into amino groups by hydrolysis, e.g. with a 2–8% alkali-metal hydroxide solution at temperatures of 70–100° C., on which the amino groups are reacted with an acylating agent which contains at least one substituent splittable as an anion and/or a C—C multiple linkage capable of addition, or with a polyhalogenopyrimidine or polyhalogenotriazine.

Examples of amines of Formula II which are of special interest are 1-amino-2-hydroxybenzene-5-sulphonic acid, 1 - amino - 2 - hydroxy-3-chloro-, -3-nitro- or -3-acetylaminobenzene - 5 - sulphonic acid, 1-amino-2-hydroxy-5-chloro-, -5-nitro- and -5-methylbenzene-3-sulphonic acid.

Of the amines of Formula IV the following are worthy of special note: 1-amino-2-hydroxy-5-chloro-, -4-chloro-3-methyl-, -3,5-dichloro-, -3-chloro-5-nitro-, -3-chloro-5-methyl-, -5-chloro-3-nitro-, -5-chloro-4-nitro- and -5-chloro-3-acetylaminobenzene.

The amines enumerated in the foregoing are also well suitable as components of the hydrazones of Formulae III and V.

The radicals $R_1$ and $R_2$, when they represent optionally substituted aliphatic radicals, may contain 1 to 10 carbon atoms, may be straight or branched, saturated or unsaturated and may bear substituents, such as hydroxyl, alkoxy, carboxy and phenyl groups or heterocyclic radicals. The prefe*rred cycloaliphatic radicals are the cyclohexyl radical and its derivatives with lower alkyl groups (methyl, ethyl). The aromatic radicals of the benzene series may bear substituents, such as lower alkyl and alkoxy groups having 1 to 5 carbon atoms, halogen atoms, hydroxyl, carboxy and aminosulphonyl (sulfamoyl) groups.

Particularly interesting groups of the formula

are, e.g., the methyl-, ethyl-, n-propyl-, isopropyl-, n-butyl-, isobutyl-, tert.-butyl-, n-amyl-, isoamyl-, n-hexyl-, n-heptyl-, n-octyl- and 2-ethylhexylamino groups; the dimethyl-, diethyl-, di-isopropyl-, di-n-propyl-, and di-n-butylamino groups; the allylamino group; the 2-hydroxyethyl-, 2-hydroxypropyl-, 3-hydroxypropyl-, 1-hydroxybutyl - 2-, 1 - hydroxy - 2 - methylpropyl - 2-amino groups; the bis- (2-hydroxyethyl)-, bis-(2-hydroxypropyl)-amino groups; the N-methyl-N-2-hydroxyethyl-, N-ethyl-N - 2 - hydroxyethyl, N-n-propyl-N- 2 - hydroxyethylamino groups; the 2 - methoxyethyl-, 2 - ethoxyethyl-, 3-methoxypropyl-, 3-ethoxypropyl-, 3-isopropoxypropyl-, 3-n-butoxypropylho - 4-methoxybutylamino groups; the bis-(2-ethoxyethyl)-amino, carboxymethylamino, N-methyl-N-carboxymethylamino, 2 - carboxyethylamino, benzylamino, furfurylamino, N-methyl-N-benzylamino, cyclohexylamino, N-methylcyclohexylamino, 4-methylcyclohexylamino, N-ethyl-N-cyclohexylamino groups; the phenylamino, 2-, 3- or 4-methylphenylamino (o,m- or p-tolylamino), 2,4-, 2,5- or 2,6-dimethylphenylamino (o,p, o,m or o,o-xylylamino), 2,4,6-trimethylphenylamino, 2-, 3- or 4-chlorophenylamino, 2- or 4-methoxy or -ethoxyphenylamino, 3- or 4-aminosulphonylphenylamino, 2- or 4-carboxyphenylamino, 4 - hydroxy - 3 - carboxyphenylamino groups; the N-methyl-, N-ethyl-, N-isopropyl-, N-n-propyl- or N - n-butyl - N-phenylamino, N-ethyl-N-4-methylphenylamino, N-methyl-N-2-carboxyphenylamino, N - 2 - hydroxyethyl-N-phenylamino, N-2-hydroxyethyl-N - 3 - methylphenylamino groups; the morpholino, piperidino, pyrrolidino and hexamethylene-imino groups.

Especially valuable dyes are the copper-containing formazane compounds which, in the metal-free state, have the formula

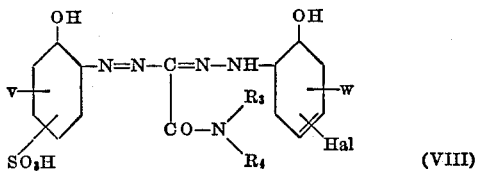

wherein

Hal represents chlorine or bromine,
v represents hydrogen, chlorine, nitro, lower alkyl, lower alkanoylamino, lower alkoxycarbonylamino or benzoylamino,
w represents hydrogen, chlorine, nitro, lower alkyl, lower alkanoylamino, lower alkoxycarbonylamino or benzoylamino, and

represents lower alkylamino, lower alkenylamino, lower hydroxyalkylamino, lower alkoxy-lower alkyl-amino, di-(lower alkyl)-amino, di-(lower hydroxyalkyl)-amino, phenylamino, phenylamino substituted on the phenyl nucleus by lower alkyl, lower alkoxy, chlorine, aminosulphonyl or di-lower alkyl, N-lower alkyl-N-phenylamino, N-lower hydroxyalkyl-N-phenylamino, cyclohexylamino, benzylamino or morpholino.

Among the copper-containing formazane compounds which, in the metal-free state, have the Formula VIII the most interesting are those which, in the metal-free state, have the formula

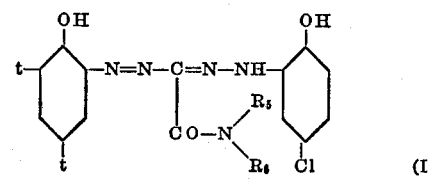

wherein
one $t$ represents —$SO_3H$, the other $t$ represents H, $CH_3$ or chlorine, and

represents alkylamino with 1 to 5 carbon atoms, hydroxyalkylamino with 2 or 3 carbon atoms, alkoxyalkylamino with altogether 3 to 6 carbon atoms, dialkylamino with 1 or 2 carbon atoms in each alkyl group, di-(hydroxyalkyl)-amino with 2 or 3 carbon atoms in each hydroxyalkyl group, allylamino, phenylamino, methylphenylamino and dimethylphenylamino.

The reaction of the diazo compounds of amines of Formula II or IV with the hydrazones of Formula III or V is best conducted in an aqueous or aqueous-organic medium in the temperature range of —5° to 20° C., preferably at 0–10° C., and in the alkaline pH region, e.g. at a pH of 9 to 13 or, preferably, 10–12. To obtain these conditions, the hydrazones are dissolved at room temperature, in an aqueous solution having a sufficient amount of sodium or potassium carbonate and/or sodium or potassium hydroxide to adjust the pH to 9 to 13; the pH value is maintained between these limits during the addition of the diazo compounds by the addition of further alkali. The metallization reaction is carried out to best effect in aqueous medium at temperatures ranging from 20° C. to 100° C., preferably at 50–80° C., and in the pH region of 2 to 7 or, preferably, 4 to 5.

As examples of suitable metal-yielding compounds may be mentioned the salts of cobalt and chromium and, in particular, those of nickel and especially these of copper, such as copper sulphate, copper chloride and copper acetate.

After completion of metallization the new dyes are precipitated from their solutions or suspensions by the addition of salt, filtered off with suction, washed if desired and then dried.

The metal-containing dyes obtained by this process are suitable for the dyeing of leather and for the exhaustion dyeing, pad dyeing and printing of natural and synthetic polyamide and polyuruethane fibres, including wool, silk, polyamide 6, polyamide 66, polyamide 11, polyamide 610 and polyamide 6/66, and of natural and regenerated cellulosic fibres, such as cotton, linen, viscose rayon, viscose staple fibre and cuprammonium rayon.

The dyeings have very good fastness to light and to wet tests, such as washing, milling, perspiration, potting and sea water, along with good rubbing, sublimation and dry cleaning fastness. On fabrics of barry dyeing polyamide fibres they give dyeings of uniform depth when applied in the presence of a highly sulphonated castor oil.

In comparison with the next comparable dyes disclosed in British patent specification 927,128, Example 2, the formazane compounds produced by the process of this invention are notable for the fact that they build up more powerfully on polyamide fibres, that they show far less difference in shade as between daylight and artificial light sources, and that their dyeings on synthetic polyamide fibres are faster to stoving, acids (tartaric and sulphuric acid) and cross dyeing (acetic acid and sulphuric acid).

In the following examples the parts and percentages are by weight and the temperatures are given in degrees centigrade.

EXAMPLE 1

63 parts of the hydrazone of the formula

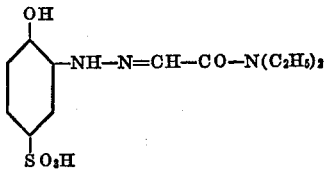

are stirred into 250 parts of water and dissolved with 30% sodium hydroxide solution at pH 11. The solution is cooled to 5–10° and to it is added slowly an ice-cold, neutralized diazo suspension prepared in the normal way with 28.7 parts of 2-amino-1-hydroxy-4-chlorobenzene. At the same time 30% sodium hydroxide solution is added dropwise to keep the pH constant at 10–11. The reaction mixture is stirred further at 5–10° until the diazo compound has disappeared, at which time 50 parts of crystallized copper sulphate ($CuSO_4 \cdot 5H_2O$) and 50 parts of a 40% sodium bisulphite solution are added. Stirring is continued at 50° until the unmetallized dye is no longer indicated. The copper-containing dye, which begins to settle out, is precipitated at 20–30° by the addition of sodium chloride and filtered off. After drying and grinding, it is obtained as a dark-coloured powder which dissolves in water to give navy blue solutions. Applied to wool, silk or synthetic polyamide fibres from an acid bath, this copper-containing dye gives level dyeings of blue shade which have good fastness to light and wet treatments.

By replacing the crystallized copper sulphate by the equivalent amount of crystallized nickel sulphate ($NiSO_4 \cdot 7H_2O$)

a similar nickel-containing dye is obtained which gives reddish blue dyeings on wool and synthetic polyamide fibres.

DYEING EXAMPLE

A dyebath is prepared with 1 part of the copper-containing dye produced as described in Example 1, 2 parts of 80% acetic acid and 4000 parts of water. At 40° 100 parts of wool are entered into the bath; the bath is brought to the boil over a period of 30 minutes and the wool is dyed for 1 hour at the boil. The bath is then cooled rapidly and the dyed wool removed, rinsed with water and dried.

EXAMPLE 2

29 parts of the hydrazone of the formula

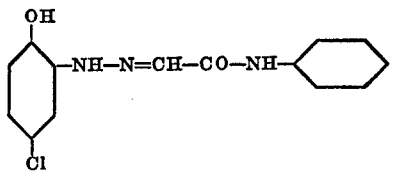

are stirred into 300 parts of water, and 30% sodium hydroxide solution is added with continued stirring until everything is dissolved. After cooling to 10°, the diazo solution prepared with 18.9 parts of 2-amino-1-hydroxybenzene-4-sulphonic acid is added slowly drop by drop; the pH is maintained at about 11 by the gradual addition of 30% sodium hydroxide solution as required. When the diazo compound has completely disappeared, the pH value is reduced to 7 with 30% hydrochloric acid, and the dye is salted out by the addition of sodium chloride and isolated.

For conversion into the copper complex, the resulting sodium salt is stirred into a solution of 25 parts of crystallized copper sulphate in 1000 parts of water, with the subsequent addition of 50 parts of 20% acetic acid. The mixture is stirred at 80° until the unmetallized dye is no longer indicated, at which time it is cooled to 40°. The copper complex is salted out with sodium chloride, filtered off, washed with 10% sodium chloride solution and dried. On grinding, the copper-containing dye is obtained as a dark-coloured powder which dissolves in water with a blue colour. It is dyed on wool, silk and synthetic polyamide fibres from an acetic acid bath and gives dyeings of grey-blue shade showing good fastness to light, washing and perspiration. By setting the dyebath with a highly sulphonated castor oil, dyeings of uniform depth are obtained on polyamide 66 materials of irregular affinity.

By replacing the crystallized copper sulphate by the equivalent amount of crystallized nickel sulphate ($NiSO_4 \cdot 7H_2O$), a similar nickel-containing dye is obtained which gives reddish blue dyeings on wool and synthetic polyamide fibres.

DYEING EXAMPLE FOR SYNTHETIC POLYAMIDE FIBRES 100 parts of a polyamide 66 fabric, which normally dyes barry, are placed at 50° C. into a dyebath prepared with 1 part of the copper-containing dye of Example 2, 2 parts of 80% acetic acid and 4 parts of a highly sulphonated castor oil in 4000 parts of water. The bath is raised to the boil over a period of 30 minutes and held at the boil for 90 minutes. On cooling, the polyamide 66 fabric is removed from the bath, rinsed with water and dried. It is dyed in a blue shade free from barriness and with good light and wet fastness properties.

The following table gives details of further copper-containing formazane dyes which can be produced according to this invention and which in the metal-free state, are of the formula

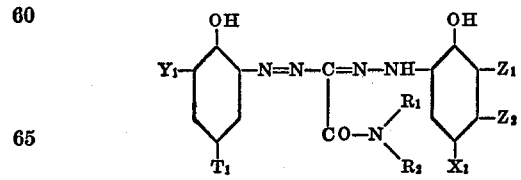

The dyes are specified in the table by the meanings of the symbols $T_1$, $Y_1$, $X_1$, $Z_1$, $Z_2$ and the radical

and by the shade of their dyeings on wool.

TABLE

| Ex. No. | $T_1$ | $Y_1$ | $X_1$ | $Z_1$ | $Z_2$ | $-N\begin{smallmatrix}R_1\\R_2\end{smallmatrix}$ | Shade |
|---|---|---|---|---|---|---|---|
| 3 | SO₃H | H | NO₂ | Cl | H | Phenylamino | Blue. |
| 4 | SO₃H | H | Cl | H | H | 3-methoxypropylamino | Do. |
| 5 | SO₃H | H | Cl | H | H | 2-ethylhexylamino | Do. |
| 6 | SO₃H | H | Cl | H | H | 4-hydroxy-3-carboxyphenylamino | Do. |
| 7 | SO₃H | Cl | Cl | H | H | Phenylamino | Do. |
| 8 | SO₃H | NO₂ | Cl | H | H | ...do... | Do. |
| 9 | SO₃H | CH₃—CO—NH— | Cl | H | H | ...do... | Do. |
| 10 | SO₃H | H | Cl | Cl | H | ...do... | Do. |
| 11 | SO₃H | H | Cl | H | NO₂ | ...do... | Do. |
| 12 | SO₃H | H | Cl | NO₂ | H | ...do... | Do. |
| 13 | CH₃ | SO₃H | Cl | H | H | Diethylamino | Do. |
| 14 | Cl | SO₃H | CH₃ | H | H | ...do... | Do. |
| 15 | NO₂ | SO₃H | Cl | CH₃—CO—NH— | H | 2-hydroxyethylamino | Do. |
| 16 | SO₃H | Cl | Cl | Cl | H | Cyclohexylamino | Do. |
| 17 | SO₃H | H | Cl | H | H | Benzylamino | Do. |
| 18 | SO₃H | H | Cl | H | H | n-Amylamino | Do. |
| 19 | SO₃H | H | Cl | H | H | N-2-hydroxyethyl-N-phenylamino | Do. |
| 20 | SO₃H | H | Cl | H | H | Morpholino | Do. |
| 21 | SO₃H | H | Cl | H | H | 4-methylphenylamino | Do. |
| 22 | SO₃H | H | H | H | Cl | 3-aminosulphonylphenylamino | Do. |
| 23 | SO₃H | Br | Br | H | H | Phenylamino | Do. |
| 24 | SO₃H | Br | Br | H | H | Vinylamino | Do. |
| 25 | Tert. amyl | SO₃H | Cl | H | H | Phenylamino | Do. |
| 26 | Tert. butyl | SO₃H | Cl | H | H | ...do... | Do. |
| 27 | SO₃H | C₂H₅O—CO—NH— | Cl | H | H | ...do... | Do. |
| 28 | Benzoylamino | SO₃H | Cl | H | H | ...do... | Do. |
| 29 | SO₃H | H | C₂H₅ | Br | H | ...do... | Do. |
| 30 | SO₃H | H | Tert. butyl | Cl | H | ...do... | Do. |
| 31 | SO₃H | H | Cl | H—CO—NH— | H | ...do... | Do. |
| 32 | SO₃H | H | Cl | H | H | N-isopropyl-N-phenylamino | Do. |
| 33 | SO₃H | C₂H₅—CO—NH— | Cl | H | H | N-methyl-N-phenylamino | Do. |
| 34 | SO₃H | H | Br | Br | H | Di-(2-hydroxyethyl)-amino | Do. |
| 35 | Iso-propyl | SO₃H | Cl | H | H | N-ethyl-N-phenylamino | Do. |
| 36 | SO₃H | H | Cl | H | H | 3-hydroxypropylamino | Do. |
| 37 | SO₃H | CH₃—O—CO—NH— | Cl | H | H | 3-isopropoxypropylamino | Do. |
| 38 | SO₃H | 4-methylbenzoylamino | Cl | H | H | Allylamino | Do. |
| 39 | SO₃H | H | Iso-propyl | Cl | H | Phenylamino | Do. |
| 40 | SO₃H | H | Tert. amyl | Cl | H | ...do... | Do. |
| 41 | 2-chlorobenzoylamino | SO₃H | Cl | H | H | 4-aminosulphonylphenylamino | Do. |
| 42 | SO₃H | n-C₃H₇—CO—NH— | Cl | H | H | 2,5-dimethylphenylamino | Do. |
| 43 | H—CO—NH | SO₃H | Cl | H | H | 4-ethoxyphenylamino | Do. |
| 44 | SO₃H | 4-methoxy-benzoylamino | Cl | H | H | 4-acetylaminophenylamino | Do. |
| 45 | SO₃H | H | Cl | CH₃—CO—NH— | H | 3-chlorophenylamino | Do. |
| 46 | SO₃H | H | Cl | CH₃—CO—NH— | H | 2-methoxyphenylamino | Do. |
| 47 | SO₃H | H | Cl | H | H | 2,4-dimethylphenylamino | Do. |
| 48 | SO₃H | H | Cl | H | H | 2,4,6-trimethylphenylamino | Do. |
| 49 | SO₃H | H | C₂H₅—CO—NH— | Cl | H | 2-methoxy-5-methylphenylamino | Do. |
| 50 | SO₃H | H | Cl | H | H | 4-methyl-cyclohexylamino | Do. |
| 51 | SO₃H | H | Cl | H | H | 2,5-diethoxyphenylamino | Do. |
| 52 | SO₃H | H | Cl | H | H | 3-methylphenylamino | Do. |
| 53 | SO₃H | H | Cl | H | H | piperidino | Do. |
| 54 | SO₃H | H | Cl | H | H | Hexamethyleneimino | Do. |
| 55 | SO₃H | H | Cl | H | H | Pyrrolidino | Do. |
| 56 | SO₃H | H | Cl | H | H | Phenylethylamino | Do. |
| 57 | SO₃H | H | Cl | H | H | 4-ethylphenylamino | Do. |
| 58 | SO₃H | H | Cl | H | H | 4-isopropylphenylamino | Do. |
| 59 | SO₃H | H | Cl | H | H | 4-n-butylphenylamino | Do. |
| 60 | SO₃H | H | Cl | H | H | 4-tert.-amylphenylamino | Do. |
| 61 | SO₃H | H | Cl | H | H | n-Butylamino | Do. |
| 62 | SO₃H | H | Benzoylamino | Cl | H | Dimethylamino | Do. |
| 63 | SO₃H | H | 4-chlorobenzoylamino | Cl | H | Ethylamino | Do. |
| 64 | SO₃H | H | Cl | n-C₄H₉—CO—NH— | H | n-Hexylamino | Do. |
| 65 | SO₃H | Cl | Cl | 2-methoxybenzoylamino | H | Methylamino | Do. |
| 66 | SO₃H | H | C₂H₅—O—CO—NH— | Cl | H | Phenylamino | Do. |
| 67 | SO₃H | H | 4-methylbenzoylamino | Cl | H | Isopropylamino | Do. |
| 68 | SO₃H | H | Cl | H | H | n-Octylamino | Do. |
| 69 | SO₃H | H | Cl | H | H | 2-hydroxypropylamino | Do. |
| 70 | SO₃H | H | Cl | H | H | 2-ethoxyethylamino | Do. |
| 71 | SO₃H | H | Cl | H | H | 2,5-dimethoxyphenylamino | Do. |
| 72 | SO₃H | H | Cl | H | H | 3-isopropoxypropylamino | Do. |
| 73 | SO₃H | H | Cl | H | H | Allylamino | Do. |
| 74 | Ethyl | SO₃H | Cl | H | H | 2-hydroxyethylamino | Do. |

Formulae of representative dyes of the foregoing examples are as follows:

EXAMPLE 1

The copper complex compound of

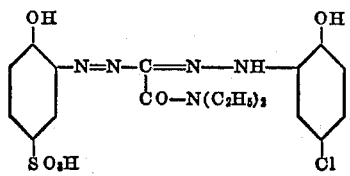

EXAMPLE 2

The copper complex compound of

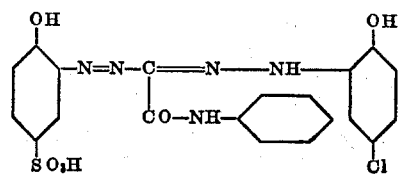

EXAMPLE 36

The copper complex compound of

[Structure: hydroxyphenyl(SO₃H)-N=N-C(=N-NH-hydroxyphenyl-Cl)-CO-NH-(CH₂)₂-OH]

EXAMPLE 72

The copper complex compound of

[Structure: hydroxyphenyl(SO₃H)-N=N-C(=N-NH-hydroxyphenyl-Cl)-CO-NH-(CH₂)₃-O-CH(CH₃)₂]

EXAMPLE 73

The copper complex compound of

[Structure: hydroxyphenyl(SO₃H)-N=N-C(=N-NH-hydroxyphenyl-Cl)-CO-NH-CH₂-CH=CH₂]

Having thus disclosed the invention what we claim is:

1. A complex of a metal and a compound of the formula

[Structure with OH, N=N-C=N-NH groups, SO₃H, Y_m, X, R₁, R₂ substituents]

wherein
the metal is copper, nickel, chromium or cobalt;
X is chloro or bromo;
each Y independently is chloro, bromo, nitro, lower alkyl, lower alkanamido, lower alkoxy carbonylamino, benzamido or monosubstituted benzamido, wherein the substituent of monosubstituted benzamido is chloro, methyl or methoxy;
$R_1$ is hydrogen, lower alkyl or lower hydroxyalkyl;
$R_2$ is lower alkyl, lower alkenyl, lower hydroxyalkyl, lower alkoxy lower alkyl, phenyl, lower alkylphenyl, lower alkoxyphenyl, xylyl, trimethylphenyl, dilower alkoxyphenyl, methyl-methoxyphenyl, chlorophenyl, hydroxycarboxyphenyl, sulfamoylphenyl, cyclohexyl, methylcyclohexyl or phenyl lower alkyl; and
each $m$ is independently 0 or 1.

2. A complex according to claim 1 wherein the metal is copper or nickel.

3. A complex according to claim 2 wherein the metal is copper.

4. A complex according to claim 3 wherein
each Y is independently chloro, nitro, lower alkyl, lower alkanamido, lower alkoxycarbonylamino or benzamido; and

[Structure: $R_1$/$R_2$-N-]

is N-lower alkylamino, N-lower alkenylamino, N-lower hydroxyalkylamino, N-(lower alkoxy lower alkyl)amino, N,N-dilower alkylamino, N,N-dilower hydroxyalkylamino, N-phenylamino, N-(monosubstituted phenyl)amino, N-xylylamino, N-lower alkyl- N-phenylamino, N-lower hydroxy alkyl-N-phenylamino, N-cyclohexylamino or N-benzylamino, wherein the substituent of N-(monosubstituted phenyl)amino is lower alkyl, lower alkoxy, chloro or sulfamoyl.

5. A complex according to claim 4 of copper and a compound of the formula

[Structure: T-hydroxyphenyl-N=N-C(=N-NH-hydroxyphenyl-Cl)-C(=O)-N(R₃)(R₄), with T substituents]

wherein
each T is hydrogen, methyl, chloro or sulfo, with the proviso that one T must be sulfo and the other T must be hydrogen, methyl or chloro; and

[Structure: $R_3$/$R_4$-N-]

is N-alkylamino having 1 to 5 carbon atoms, N-hydroxyalkylamino having 2 or 3 carbon atoms, N-alkoxyalkylamino having altogether 3 to 6 carbon atoms, N,N-dialkylamino wherein each alkyl has 1 or 2 carbon atoms, N,N-di-(hydroxyalkyl)amino wherein each hydroxyalkyl group has 2 or 3 carbon atoms, N-allylamino, N-phenylamino, N-tolylamino or N-xylylamino.

6. A complex according to claim 5 of copper and the compound of the formula

[Structure: hydroxyphenyl(SO₃H)-N=N-C(=N-NH-hydroxyphenyl-Cl)-C(=O)-N(C₂H₅)(C₂H₅)]

7. A complex according to claim 5 of copper and the compound of the formula

[Structure: hydroxyphenyl(SO₃H)-N=N-C(=N-NH-hydroxyphenyl-Cl)-C(=O)-N(H)(phenyl)]

8. A complex according to claim 5 of copper and the compound of the formula

[Structure: hydroxyphenyl(SO₃H)-N=N-C(=N-NH-hydroxyphenyl-Cl)-C(=O)-N(H)-(CH₂)₂-OH]

9. A complex according to claim 5 of copper and the compound of the formula

[Structure: hydroxyphenyl(SO₃H)-N=N-C(=N-NH-hydroxyphenyl-Cl)-C(=O)-N(H)-(CH₂)₃-O-CH(CH₃)₂]

10. A complex according to claim 5 of copper and the compound of the formula
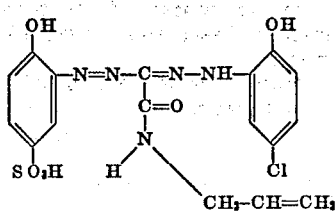
References Cited
UNITED STATES PATENTS
3,109,840  11/1963  Beffa et al. ......... 260—149
3,497,493  2/1970  Grossmann ......... 260—149
LEWIS GOTTS, Primary Examiner
C. F. WARREN, Assistant Examiner
U.S. Cl. X.R.
8—42 B, 43; 260—193

UNITED STATES PATENT AND TRADEMARK OFFICE
CERTIFICATE OF CORRECTION

PATENT NO. : 3,773,748

DATED : November 20, 1973

INVENTOR(S) : PHILIPPE GRANDJEAN and WILLY STEINEMANN

It is certified that error appears in the above-identified patent and that said Letters Patent are hereby corrected as shown below:

Column 2, line 9, fill in line to X.
Column 3, line 16, " prefe*rred " should read -- preferred --.
Column 3, line 39, " n-butoxypropylho - " should read -- n-butoxypropyl--, --.
Column 3, lines 60-65, change that portion of the formula reading

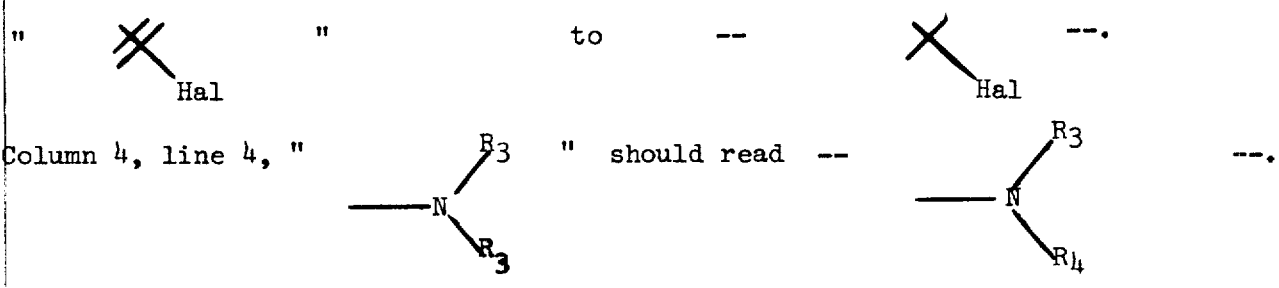

Column 4, line 28, " (I " should read -- (IX), --.
Column 4, line 65, " these " should read -- those --.
Column 4, line 75, " polyuruethane " should be -- polyurethane --.
Column 6, line 47, " placed at 50° C. into a dyebath prepared " should be -- placed into a dyebath at 50° C. prepared --.
Column 9, line 43, " or cobalt; " should be -- or cobalt, --.
Column 9, line 44, " or bromo; " should be -- or bromo, --.
Column 9, line 46, " alkoxy carbonylamino " should be -- alkoxycarbonylamino--.

UNITED STATES PATENT OFFICE
CERTIFICATE OF CORRECTION

Page 2

Patent No. 3,773,748　　　　　　　　　Dated November 20, 1973

Inventor(s) Philippe Grandjean and Willy Steinemann

It is certified that error appears in the above-identified patent and that said Letters Patent are hereby corrected as shown below:

Column 9, line 49, " methoxy; " should be -- methoxy, --.
Column 9, line 50, " hydroxyalkyl; " should be -- hydroxyalkyl, --.
Column 9, line 56, " alkyl; and " should be -- alkyl, and --.
Column 9, line 65, " benzamido; and " should be -- benzamido, and --.
Column 10, line 19, " chloro; and " should be -- chloro, and --.

Signed and Sealed this twenty-ninth Day of July 1975

[SEAL]

Attest:

RUTH C. MASON　　　　　　　　　　C. MARSHALL DANN
Attesting Officer　　　　　　　　Commissioner of Patents and Trademarks